(12) United States Patent
Miguchi et al.

(10) Patent No.: US 6,715,379 B2
(45) Date of Patent: Apr. 6, 2004

(54) POWER TRANSMISSION DEVICE OF ALL TERRAIN VEHICLE AND ALL TERRAIN VEHICLE

(75) Inventors: Akio Miguchi, Kobe (JP); Yasutaka Kobayashi, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 12 days.

(21) Appl. No.: 10/126,341

(22) Filed: Apr. 18, 2002

(65) Prior Publication Data

US 2002/0152838 A1 Oct. 24, 2002

(30) Foreign Application Priority Data

Apr. 18, 2001 (JP) ........................................ 2001-119380

(51) Int. Cl.[7] ................................................ F16H 3/02
(52) U.S. Cl. .................. 74/745; 475/263; 192/56.4; 464/42; 464/43; 464/44
(58) Field of Search .................... 74/745, 325, 333, 74/664, 721, 665 GE; 475/263; 464/42, 44, 43; 192/56.6

(56) References Cited

U.S. PATENT DOCUMENTS

| | | | | |
|---|---|---|---|---|
| 4,367,661 A | * | 1/1983 | Moroto et al. | 74/665 GE |
| 4,458,558 A | * | 7/1984 | Frank | 74/665 GE |
| 4,660,438 A | * | 4/1987 | Tatara et al. | 477/41 |
| 4,673,377 A | * | 6/1987 | Akutagawa | 474/1 |
| 4,805,706 A | * | 2/1989 | Stone | 173/93.5 |
| 4,873,879 A | * | 10/1989 | Butterfield et al. | 475/200 |
| 4,880,407 A | * | 11/1989 | Carton-Bacon | 464/43 |
| 5,088,352 A | * | 2/1992 | Ishimaru | 477/46 |
| 5,407,046 A | * | 4/1995 | Kawasaki | 192/56.3 |
| 6,148,981 A | * | 11/2000 | Lindenthal | 192/56.3 |
| 6,155,371 A | * | 12/2000 | Izumi | 180/292 |
| 6,283,863 B1 | * | 9/2001 | Lang et al. | 464/44 |

FOREIGN PATENT DOCUMENTS

| | | | | |
|---|---|---|---|---|
| EP | 0386746 A1 | * | 9/1990 | B60K/41/14 |
| JP | 63176862 A | * | 7/1988 | F16H/37/06 |
| JP | 63-186043 | | 8/1988 | |
| JP | 03004064 A | * | 1/1991 | F16H/9/12 |
| JP | 03157520 A | * | 7/1991 | F16D/7/02 |

* cited by examiner

Primary Examiner—Charles A Marmor
Assistant Examiner—David D. Le
(74) Attorney, Agent, or Firm—Kolisch Hartwell, P.C.

(57) ABSTRACT

An all terrain vehicle comprising a V-belt continuously variable transmission and a gear-type transmission, being capable of transmitting drive torque from an engine with controlled engine braking but without loss of the torque, thereby giving a rider an improved driving feel. The V-belt continuously variable transmission and the gear-type transmission are placed in this order from upstream in a power transmission path from the engine to wheels. A one-way clutch for transmitting only the drive torque from the engine to the wheel and a torque limiter for transmitting the torque less than a predetermined value are arranged in parallel, between, e.g., a countershaft and forward intermediate gears fitted onto the countershaft.

20 Claims, 11 Drawing Sheets

PRIOR ART

Fig. 1

PRIOR ART

POWER TRANSMISSION DEVICE OF ALL TERRAIN VEHICLE AND ALL TERRAIN VEHICLE

CROSS-REFERENCE TO RELATED APPLICATION

This application is based on and claims priority to Japanese Application No. 2001-119380, the entire disclosure of which is incorporated herein by reference.

BACKGROUND OF THE INVENTION

1. Field of the Invention

The present invention relates to a power transmission device of an all terrain vehicle (ATV). More particularly, the present invention relates to a power transmission device of an all terrain vehicle comprising a V-belt continuously variable transmission (CVT) and a gear-type transmission which are arranged in this order from upstream in a power transmission path from an engine to wheels, and an all terrain vehicle comprising the power transmission device.

2. Description of the Related Art

In the all terrain vehicle comprising the V-belt continuously variable transmission and the gear-type transmission, the V-belt continuously variable transmission is adapted to perform automatic speed change according to an engine speed and increase/decrease in load of wheels, and some gear-type transmissions are adapted to perform switching between forward and reverse, between forward high-speed and forward low-speed, and the like, by operation of a hand-operated shift lever.

In this all terrain vehicle, a braking effect of the engine is commonly produced by a friction force generated between a V belt and sheaves in the V-belt continuously variable transmission. Specifically, torque can be transmitted from wheel side to engine side while engine braking.

The all terrain vehicle travels over uneven roads, mountains, steep slopes, rough terrains, shores, and the like, and therefore, the engine brake is applied more frequently than those of general vehicles.

However, when the braking effect of the engine is produced by the friction force between the V-belt and the sheave of the V-belt continuously variable transmission as described above, because the coefficient of friction changes with wear of the belt, and changes in conditions of temperature, moisture, and the like, the braking effect of the engine varies, and excessive engine braking effect, for example, may result, which does not produce a comfortable driving feel.

On the other hand, where as a countermeasure to prevent excessive engine braking effect, an average braking effect of the engine is set relatively lower by lowering a belt pressing force of a movable sheave during engine braking, the engine braking effect is somewhat insufficient, which does not produce a comfortable driving feel.

Figure 1:
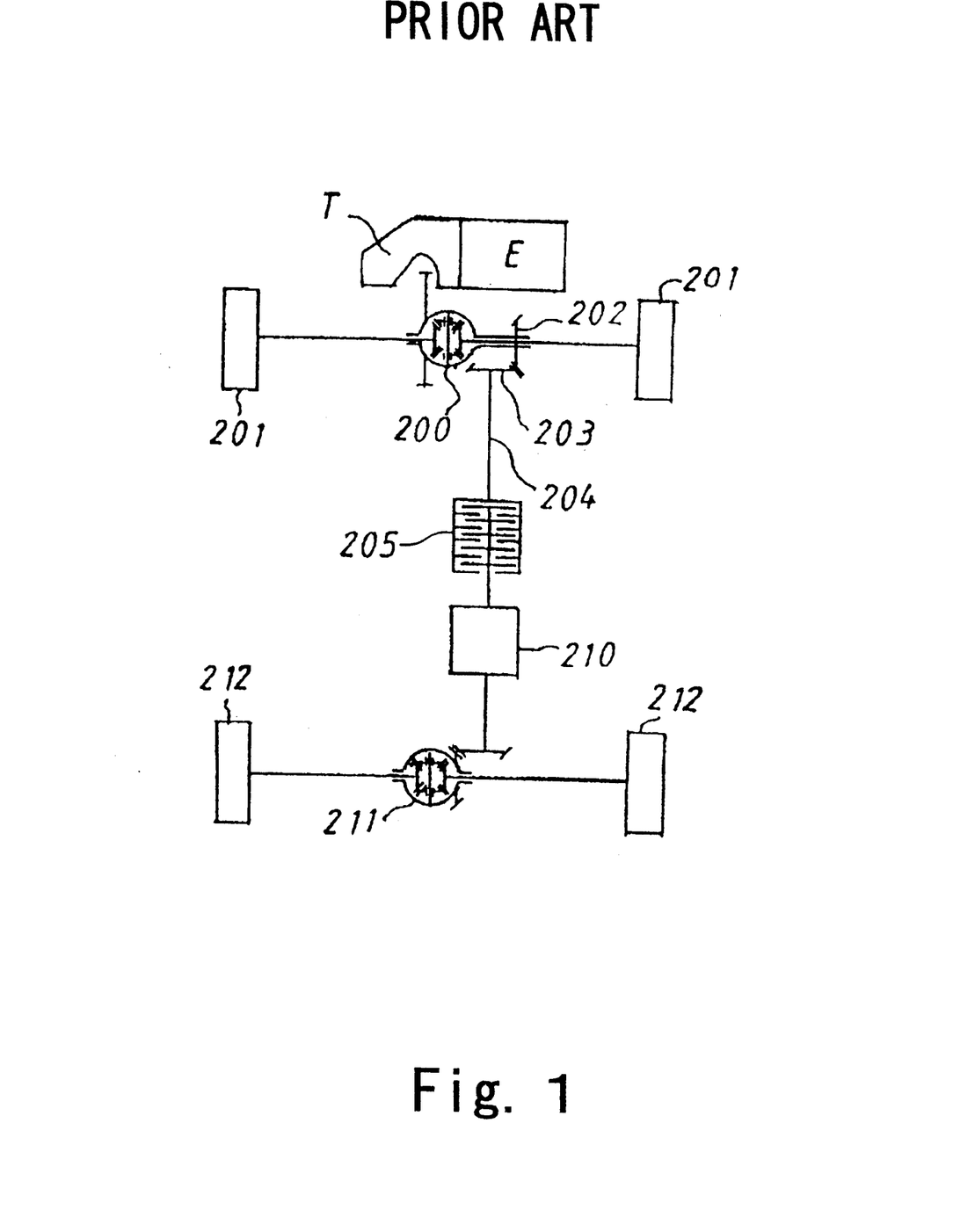
FIG. 1 is a plan view schematically showing the conventional power transmission device applied to a four wheeled vehicle.

As prior art directed to controlling the engine brake, a power transmission device is disclosed in Publication of Unexamined Patent Application No. Sho. 63-186043. In this power transmission device, as shown in FIG. 1, power of the engine E is transmitted from a transmission T to right and left front wheels 201 through a front-wheel differential unit 200. The power is further transmitted from bevel gears 202, 203 to a viscous clutch 205 through a propeller shaft 204, and to rear wheels 212 through a clutch device 210 for controlling the engine brake and a rear-wheel differential unit 211.

Figure 2:
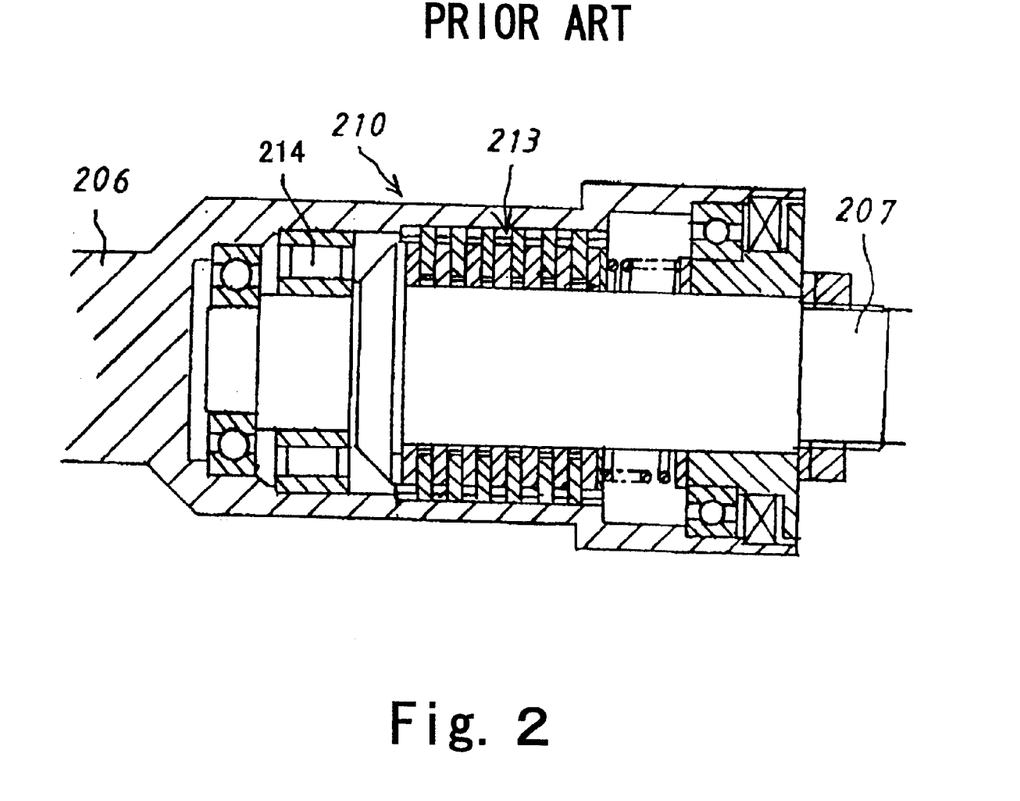
FIG. 2 is an enlarged cross-sectional view showing a clutch mechanism of the power transmission device of FIG. 1.

As shown in FIG. 2, in the clutch device 210 for the engine brake, a one-way clutch 214 and a multi-plate-friction-type limit clutch 213 are provided in parallel between two rotational shafts 206, 207 provided in series on the side of the engine E and on the side of wheels 201, 212, respectively. It should be appreciated that this conventional all terrain vehicle does not employ the technique for producing the braking effect by the friction force between the belt and the sheave, because of absence the V-belt continuously variable transmission.

The one-way clutch 214 and the limit clutch 213 are located downstream of the transmission T, the front-wheel differential unit 200, the propeller shaft 204, and the viscous clutch 205 in a power transmission path from the engine E. For this reason, the transmitted torque becomes larger as it goes from the engine E toward the downstream in the power transmission path, and hence, the limit clutch 213 of large friction capacity and the one-way clutch 214 of large transmission capacity are needed. Consequently, the clutch device for controlling the engine brake becomes large-sized and its cost is increased.

SUMMARY OF THE INVENTION

The present invention addresses the above-described conditions, and an object of the present invention is generally to improve the comfort and feel of driving for an all terrain vehicle comprising a V-belt continuously variable transmission and a gear-type transmission. To be specific, the object is as follows.

(1) Transmitted torque from the wheel generated while engine braking can be controlled with higher precision without loss of drive torque transmitted from the engine.

(2) Even when there is some fluctuation in the torque transmitted to the V-belt continuously variable transmission while the engine braking, the production of excessive engine braking effect is prevented, thereby maintaining average braking effect at high level and stabilizing the engine braking effect.

(3) A torque limiter and a one-way clutch for controlling the engine brake are small-sized to be accommodated compactly. In addition, forced lubrication for the torque limiter and the one-way clutch is conducted in a simplified manner.

To achieve the above-described object, according to the present invention, there is provided an all terrain vehicle comprising a V-belt continuously variable transmission and a gear-type transmission placed in this order from upstream in a power transmission path from an engine to wheels, in which a one-way clutch for transmitting only drive torque from the engine to the wheel and a torque limiter for transmitting torque with a predetermined value or less are arranged in parallel between a transmission shaft in the gear-type transmission and a transmission gear fitted to the transmission shaft.

By arranging the one-way clutch and the torque limiter in parallel in this manner, the transmitted torque from the wheel generated while the engine braking can be controlled with higher precision without loss of the drive torque transmitted from the engine to the wheel.

Even when there is some fluctuation in the torque transmitted to the V-belt continuously variable transmission during engine braking, the torque limiter functions to prevent production of the excessive engine braking effect. Thereby, the average engine braking effect can be maintained at high level, and the braking effect can be stabilized.

Further, since the torque limiter and the one-way clutch are placed in the gear-type transmission, the transmitted torque is smaller in the present invention in contrast to the case where they are provided downstream in the power transmission path, e.g., in a differential unit of wheels or on a propeller shaft. Therefore, the torque limiter and the one-way clutch can be small-sized and can be easily placed without ensuring a special space. Besides, forced lubrication oil in the gear-type transmission case can be directly utilized as lubricating oil for the torque limiter, which eliminates a need for special pipings.

The one-way clutch and the torque limiter are provided to a transmission intermediate shaft placed between a transmission input shaft and a transmission output shaft, among the transmission shafts in the gear-type transmission. In accordance with this, the torque limiter and the one-way clutch can be easily placed by making use of an empty space around the intermediate shaft in contrast to the case where these components are provided to a shaft commonly provided with a gear shift mechanism or the like, e.g., the transmission input shaft. In addition, since the torque necessary for the transmission intermediate shaft is smaller than that of the transmission output shaft, the torque limiter and the one-way clutch can be small-sized.

The torque limiter is comprised of an inner peripheral tapered face of the transmission gear, a cone member having an outer peripheral tapered face being pressed against the inner peripheral tapered face, and biasing means for causing these tapered faces to be pressed against each other by a given force. In this constitution, the torque limiter can be placed compactly between the transmission gear and the transmission shaft. Preferably, the biasing means may be a coil spring to make the torque limiter simple. The biasing means also may be those utilizing hydraulic pressure.

Two cone members of the torque limiter may be provided on both sides of the one-way clutch in the axial direction. This makes it possible for the cone members to function as bearings to be provided on both sides of the torque limiter. Therefore, the number of parts can be reduced and a more compact constitution is attained.

The torque limiter may be a multi-plate friction-type torque limiter. Thereby, the torque capacity can be increased while keeping radial dimension compact.

The above and further objects and features of the invention will more fully be apparent from the following detailed description with accompanying drawings.

DETAILED DESCRIPTION OF THE PREFERRED EMBODIMENTS

The present invention will now be described in detail referring to the accompanying drawings illustrating the embodiments thereof.

Embodiment 1

Figure 3:
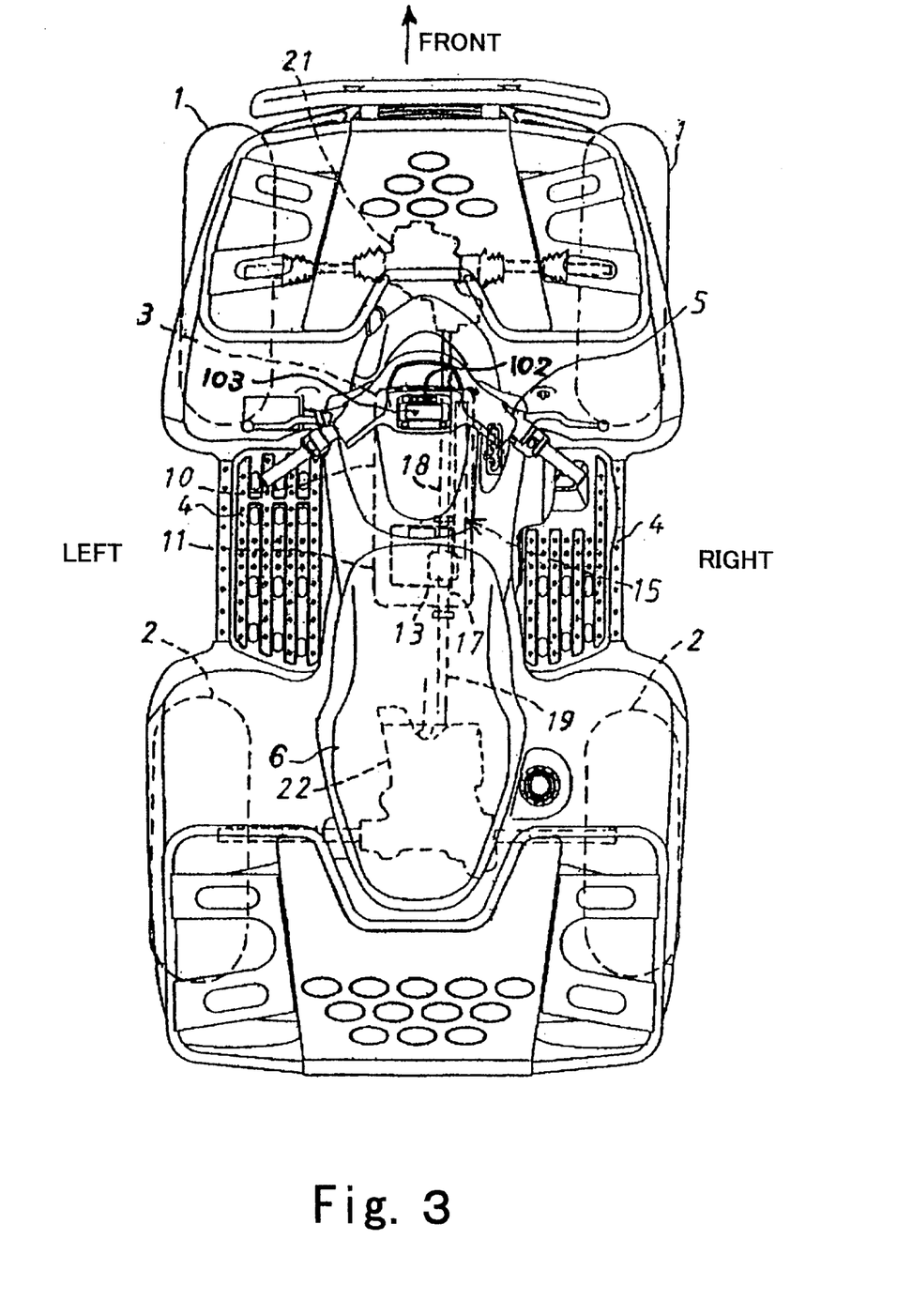
FIG. 3 is a plan view showing a straddle-type four wheeled all terrain vehicle to which the present invention is applied.

FIG. 3 is a plan view showing an entire straddle-type four wheeled all terrain vehicle to which the present invention is applied. For the sake of convenience, front and rear (longitudinal) direction and right and left (lateral) direction seen from a rider on the vehicle are defined as front and rear direction and right and left direction of the vehicle, respectively, in FIG. 3.

The all terrain vehicle comprises a pair of right and left front wheels 1, a pair of right and left rear wheels 2, an engine 3 between the front and rear wheels 1, 2, and foot steps 4 on right and left sides of the engine 3. The vehicle further comprises a bar-type steering handle 5 at a front side of an upper portion of the vehicle's body, and a straddle-type seat 6 at a rear side of the upper portion. The handle 5 is provided with indicators such as a speed meter 103, display lamps 102, and the like, at a center thereof.

A transmission case 11 is provided integrally with a crankcase 10 of the engine 3 at a rear end of the crankcase 10. A gear-type transmission 13 is mounted in the transmission case 11. A V-belt continuously variable transmission 15 is provided on the right side face of the crankcase 10 and located upstream of the gear-type transmission 13 in a power transmission path.

A drive shaft 17 is provided below the transmission case 11 such that it extends along the longitudinal direction of the vehicle. A front-wheel-drive propeller shaft 18 and a rear-wheel-drive propeller shaft 19 are respectively connected to a front end and a rear end of the drive shaft 17. A front end of the propeller shaft 18 is connected to a gear mechanism in a front-wheel-reduction-gear case 21 and a rear end of the propeller shaft 19 is connected to a gear mechanism in a rear-wheel-reduction-gear case 22.

Figure 4:
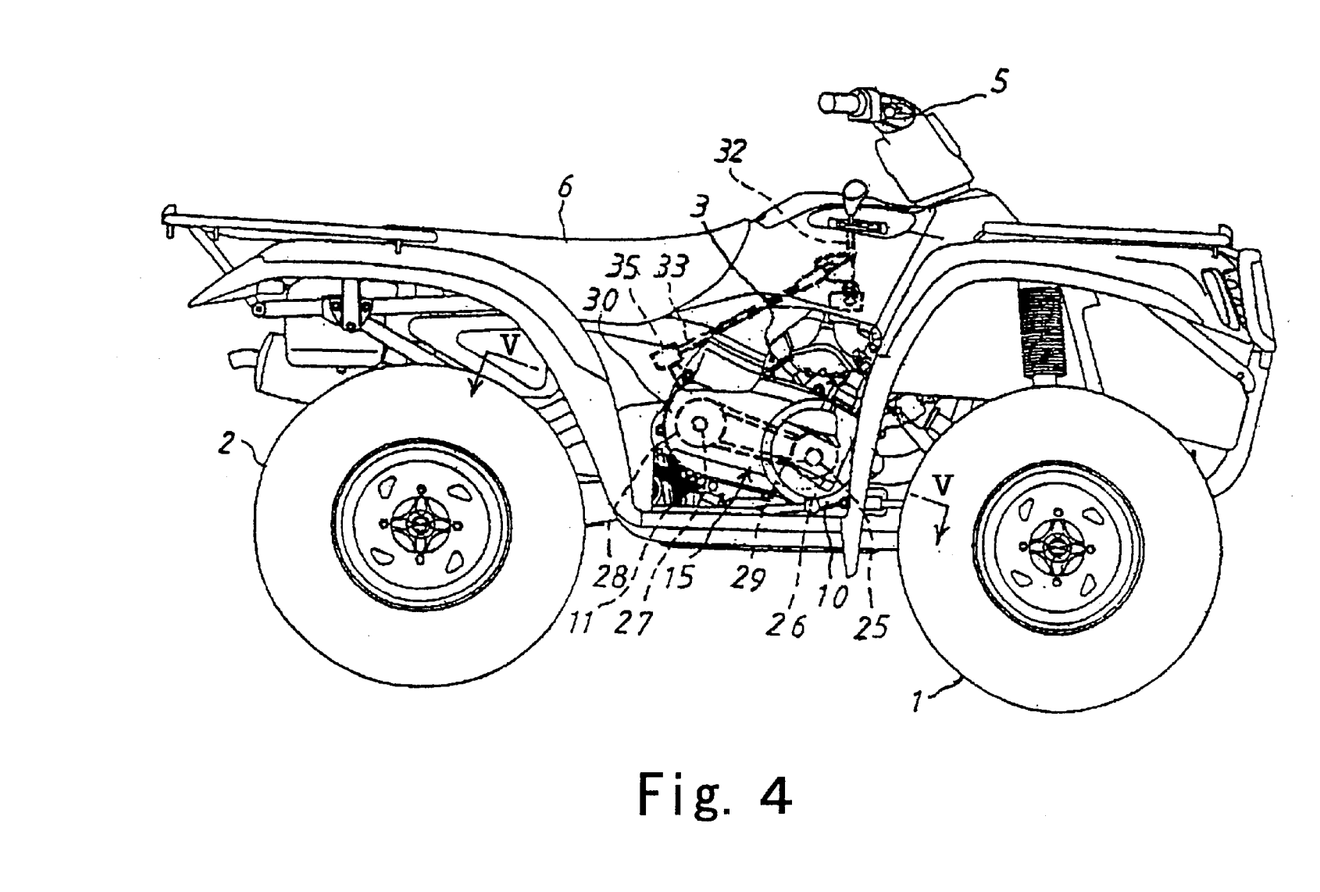
FIG. 4 is a right-side view of the all terrain vehicle of FIG. 3.

FIG. 4 is a right-side view of FIG. 3. The V-belt continuously variable transmission 15 is comprised of a drive pulley 26 mounted to a drive shaft 25, which is placed in a front section of the vehicle, a driven pulley 28 mounted to a driven shaft 27, which is placed in a rear section of the vehicle, and a V belt 29 put around the pulleys 26, 28. These components are covered by a belt converter cover 30.

A shift lever 32 is provided below and on the right side of the handle 5. The shift lever 32 is cooperatively connected to a change lever 35 provided at an upper end portion of the transmission case 11 by means of a connecting rod 33.

V-belt Continuously Variable Transmission

Drive Pulley

Figure 5:
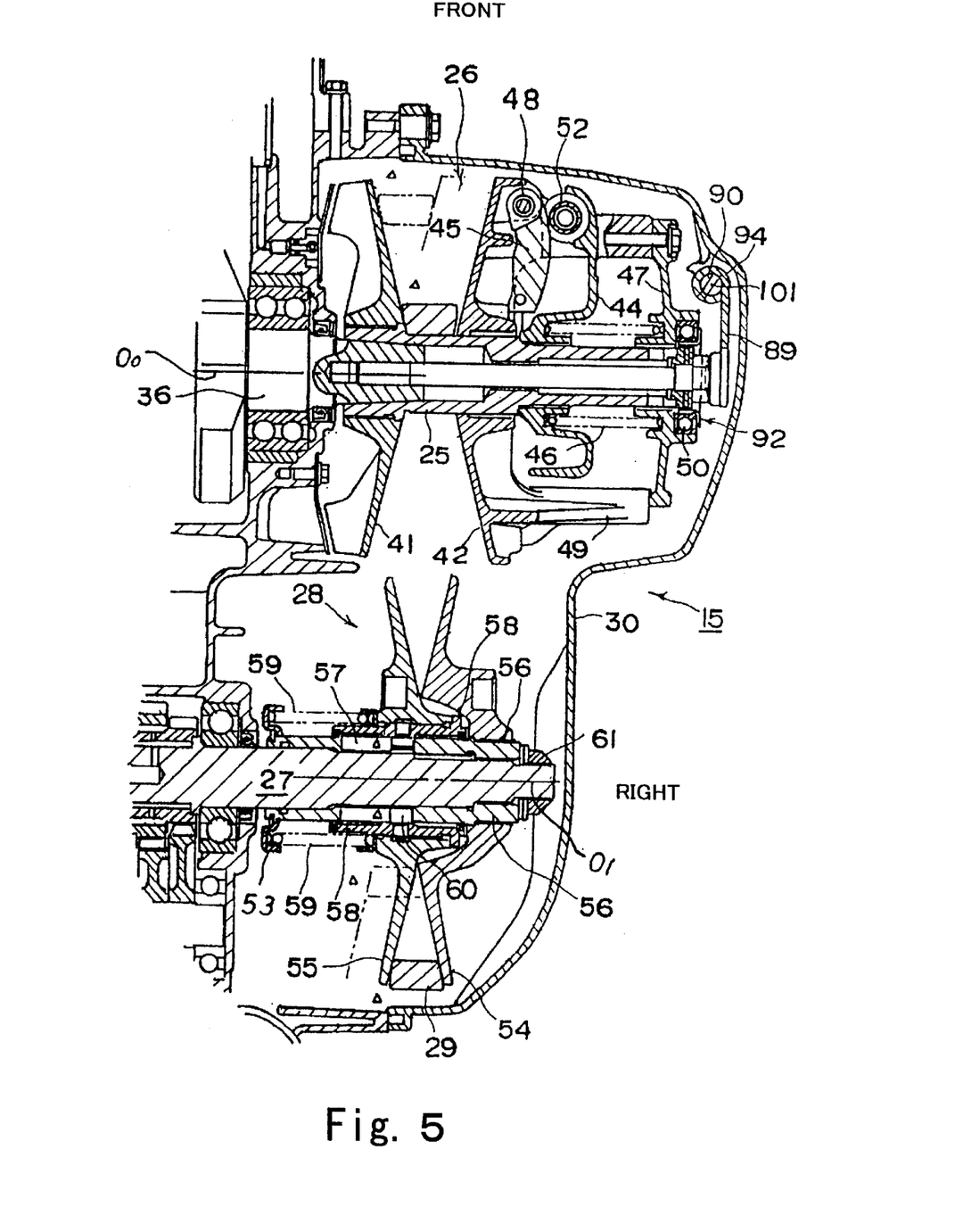
FIG. 5 is a cross-sectional view taken along line V—V of a V-belt continuously variable transmission of FIG. 4.

FIG. 5 is an enlarged cross-sectional view taken along line V—V of the V-belt continuously variable transmission 15 of FIG. 4 and sectioned along a plane traversing through the drive shaft 25 and the driven shaft 27. The drive shaft 25 is coaxially coupled to a right end of a crankshaft 36 of the engine 3. The drive pulley 26 is comprised of a left-side fixed sheave 41 and a movable sheave 42 axially opposed to the fixed sheave 41 from the right side. The fixed sheave 41 is fixed to the drive shaft 25 so as to be unrotatable and axially unmovable. The movable sheave 42 engages with the drive shaft 25 by means of a spider 44 in the rotational direction so as to be rotatable integrally with the drive shaft 25 and fitted to the drive shaft 25 so as to be axially movable.

There is provided a drive pulley thrust generating mechanism placed on the back face side (on the right side) of the movable sheave 42 and comprised of the spider 44, a plurality of fly weights 45, a pressure-adjusting spring 46, a support board 47, and the like. The fly weights 45 are respectively rotatably supported by means of a plurality of pins 48 provided on the back face of the movable sheave 42 and opened rightwardly by a centrifugal force with an increase in the rotational speed of the drive shaft 25. A connecting arm 49 is provided on the back face of the movable sheave 42 so as to extend rightwardly, passing through the spider 44. A support board 47 is coupled to a right edge of the connecting arm 49. The support board 47 is fitted onto the drive shaft 25 so as to be axially movable and provided with a bearing 50 fitted to an inner peripheral end portion thereof. An annular seat (collar) 92 L-shaped in cross section with which a restricting lever 89 for engine brake is in contact is fitted into an inner ring of the bearing 50. The annular seat 92 and the bearing 50 are movable integrally with the movable sheave 42 along the center axis of the drive shaft 25 via the support board 47 and the connecting arm 49.

The spider 44 is placed on the right side of the movable sheave 42 and screwed onto the drive shaft 25. The spider 44 is provided with a plurality of pressure-receiving rollers 52 with which the fly weights 45 are respectively in contact. The pressure-adjusting spring 46 is compressively provided between the spider 44 and the support board 47. By biasing the support board 47 rightwardly, the movable sheave 42 is indirectly biased rightwardly by means of the connecting arm 49, i.e., biased to be away from the fixed sheave 41. When the engine speed is increased to cause the fly weights 45 to be opened, the movable sheave 42 moves leftwardly together with the support board 47 against the pressure-adjusting spring 46 by a reaction force of the pressure-receiving rollers 52. Thereby, the V belt 29 is pressed between the sheaves 41, 42.

Even while an idling speed, the restricting lever 89 is rotated to cause the support board 47 to be pressed leftwardly by a given amount by means of the annular seat 92 and the bearing 50, thereby causing the movable sheave 42 to be pressed against a side face of the V belt 29. Thus, the engine braking effect is produced.

Driven Pulley

The driven pulley 28 is comprised of a fixed sheave 54 fixed to a tubular cam shaft 56 and a movable sheave 55 fixed onto a sleeve 58 and opposed to the fixed sheave 54 from the left side along the center axis of the cam shaft 56. The cam shaft 56 is fitted onto the driven shaft 27 so as to be mounted unrotatably and axially unmovably. The cam shaft 56 is secured onto the driven shaft 27 by means of a nut 61 screwed onto the driven shaft 27. The fixed sheave 54 is screwed onto a screw portion 56a formed at an outer peripheral face of a right end portion of the cam shaft 56, thereby allowing the fixed sheave 54 to rotate integrally with the tubular cam shaft 56 and the driven shaft 27 and to be axially unmovable.

The movable sheave 55 is screwed onto the outer peripheral face of the sleeve 58. The sleeve 58 is fitted onto the outer peripheral face of the cam shaft 56 by means of a pair of right and left bearing metals so as to be rotatable and axially movable. That is, the movable sheave 55 is rotatable integrally with the sleeve 58 and axially movable integrally therewith.

As a pressure-adjusting mechanism of the driven pulley 28, a pressure-adjusting spring 59 is compressively provided between the spring-receiver ring 53 fixed to a left end of the cam shaft 56 and the movable sheave 55. The movable sheave 55 is biased rightwardly by a spring force of the pressure-adjusting spring 59. The cam shaft 56 is provided with a spiral cam groove 57, while the sleeve 58 is provided with a step-shaped cam roller 60 engaging with the cam groove 57. This cam mechanism causes the sleeve 58 to move in spiral relative to the cam shaft 56. Alternatively, the roller 60 may be provided on the cam shaft 56 and the cam groove 57 may be provided on the sleeve 58.

Gear-Type Transmission

Figure 6:
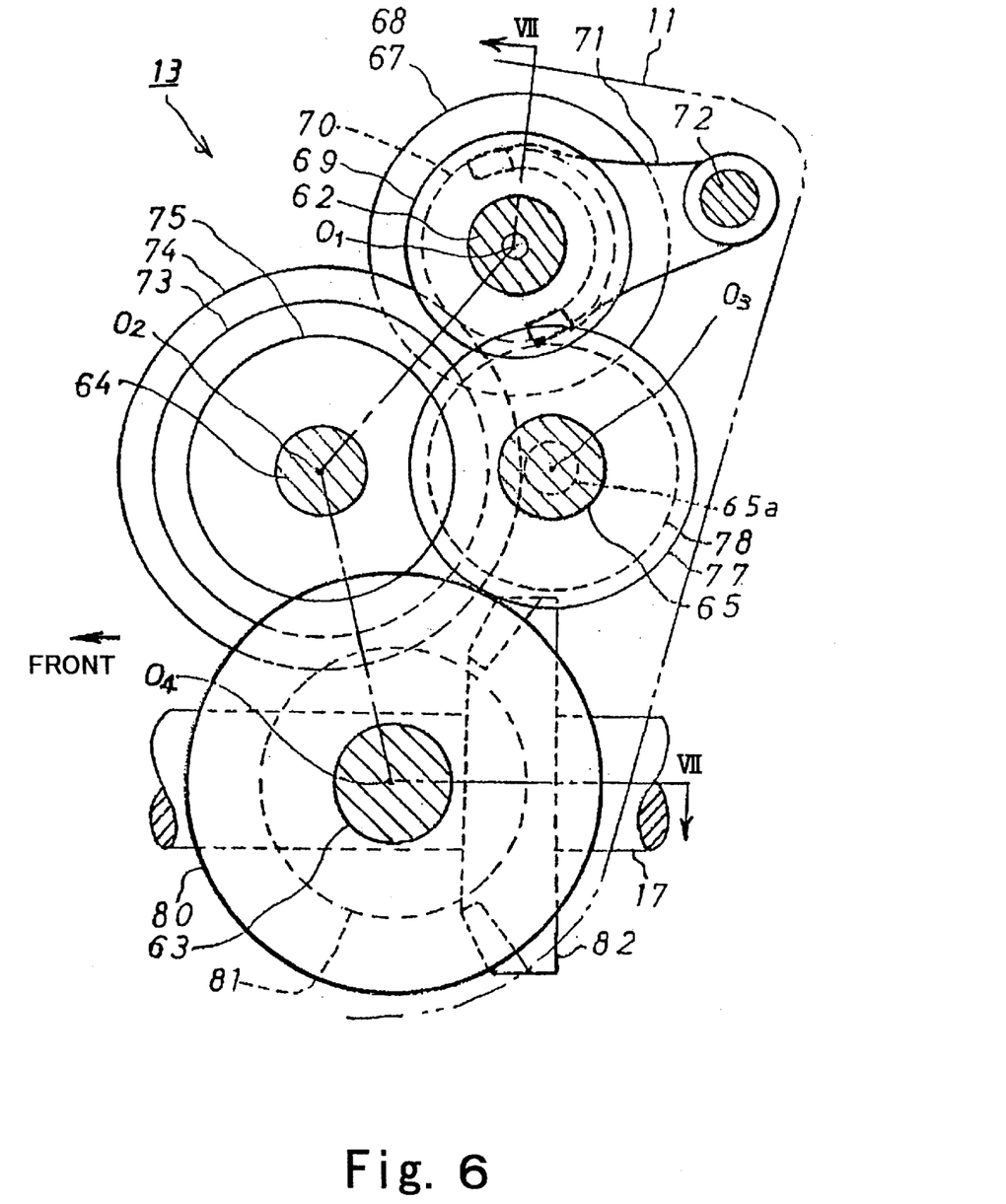
FIG. 6 is a left-side cross-sectional view of a gear-type transmission of FIG. 3 (corresponding to a cross-sectional view taken along line VI—VI of FIG. 7)

FIG. 6 is a left-side cross-sectional view showing placement of respective transmission shafts of the gear-type transmission 13. The transmission shafts include a transmission input shaft 62 extending in the right and left direction, a countershaft 64, a reverse idle shaft 65, and a transmission output shaft 63, which are arranged in parallel with one another (see FIG. 7). The transmission input shaft 62 is placed in an upper portion in the transmission case 11 and the transmission output shaft 63 is placed in a lower portion in the transmission case 11. The countershaft 64 and the reverse idle shaft 65 are transmission intermediate shafts located at a vertical position between the transmission input shaft 62 and the transmission output shaft 63 and spaced from each other in the front and rear direction.

Further, a single shift rod 72 is placed behind and obliquely above the transmission input shaft 62 so as to be in parallel with the input shaft 62. References $O_1, O_2, O_3, O_4$ respectively denote center axes of the transmission input shaft 62, the countershaft 64, the reverse idle shaft 65, and the transmission output shaft 63. The shift rod 72 is cooperatively connected to a change lever 35 of FIG. 4 by means of a shift lever mechanism or the like and a shift fork 71 is fixed to the shift rod 72.

Figure 7:
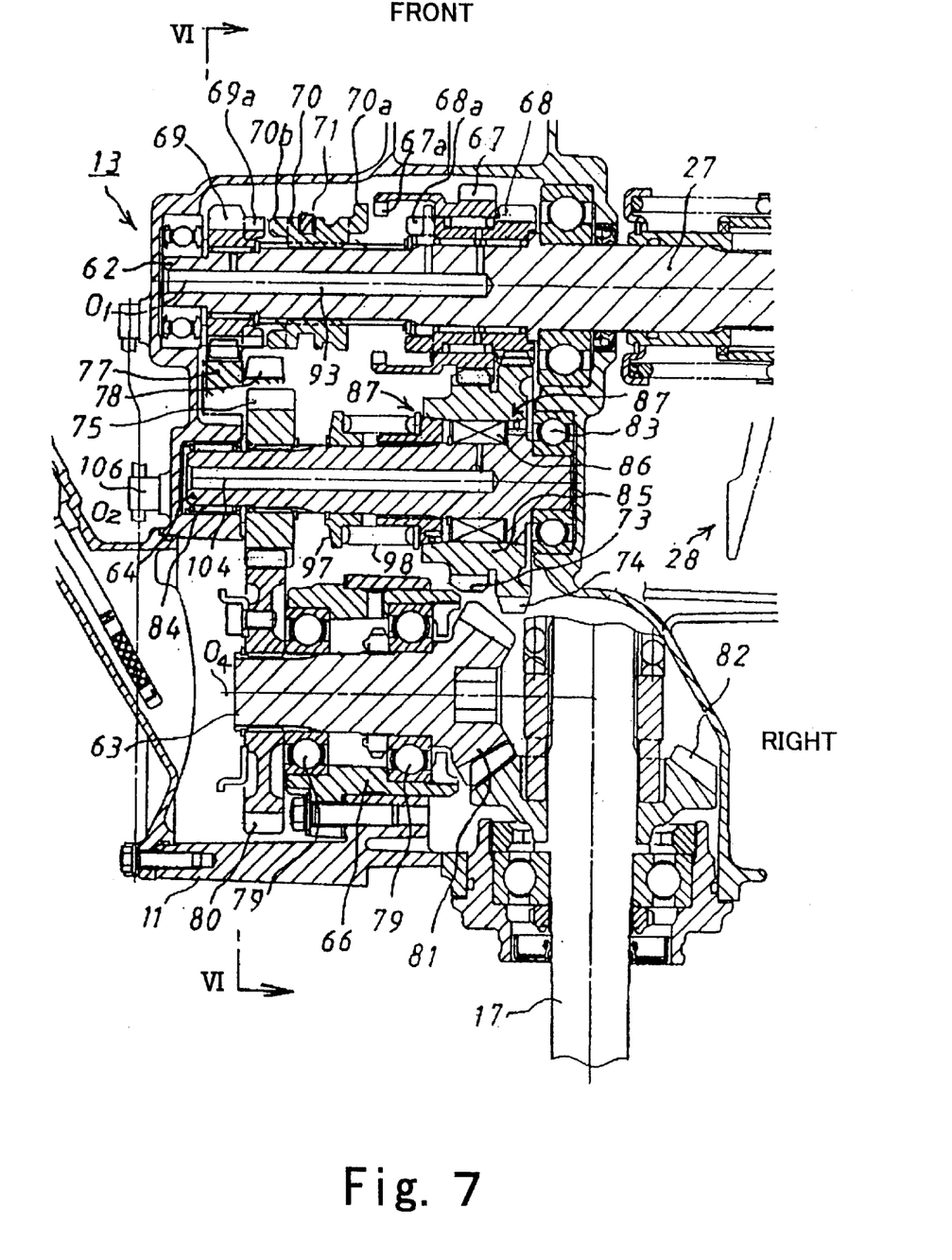
FIG. 7 is a cross-sectional view taken along line VII—VII of FIG. 6.

FIG. 7 is a cross-sectional view (cross-sectional view taken along line VII—VII of FIG. 6) sectioned along a plane traversing the center axis $O_1$ of the transmission input shaft 62, the center axis $O_2$ of the countershaft 64, and the center axis $O_4$ of the output shaft 63. The transmission input shaft 62 is formed integrally with the driven shaft 27 of the driven pulley 28. The countershaft 64 is supported at a right end portion by a right end wall of the transmission case 11 by means of the ball bearing 83 and at a left end portion by a left end wall by means of a needle bearing 84. The output shaft 63 is shorter than the countershaft 64 and supported by a shaft holder 66 fixed to the inside of the transmission case 11 by means of a pair of right and left bearings 79. The drive shaft 17 is placed on the right side of the output shaft 63.

A high-speed forward transmission gear 67 and a low-speed forward transmission gear 68 are provided at a right end portion of the transmission input shaft 62 so as to be axially adjacent to each other. A reverse transmission gear 69 is provided at a left end portion of the transmission input shaft 62. A shift sleeve 70 for switching of the gear-type transmission 13 among "high-speed forward", "low-speed forward", "neutral" and "reverse" is spline-fitted onto an axially intermediate portion of the transmission input shaft 62 so as to be axially movable. A shift fork 71 engages with an outer peripheral annular groove of the shift sleeve 70.

The reverse transmission gear 69 has a dog claw 69a at a right end face and is rotatably fitted onto the transmission input shaft 62 by means of a needle bearing. The low-speed forward transmission gear 68 has a dog claw 68a at a left edge of a leftwardly extending boss portion and is rotatably fitted onto the transmission input shaft 62 by means of a needle bearing. The high-speed forward transmission gear 67 has a dog claw 67a facing inwardly at a left end portion of a leftwardly extending arm portion and is rotatably fitted onto an outer periphery of the boss portion of the low-speed forward transmission gear 68 by means of a needle bearing. A forward dog claw 70a and a reverse dog claw 70b are respectively formed at right and left end faces of the shift sleeve 70.

The axial spacing between the dog claw 67a for high-speed forward and the dog claw 68a for low-speed forward permits the forward dog claw 70a of the shift sleeve 70 to be at neutral position. The shift fork 71 engages with the outer peripheral annular groove of the shift sleeve 70.

High-speed forward intermediate gears 73, 74 are provided at the right end portion of the countershaft 64 such that they are respectively in mesh with the high-speed forward transmission gear 67 and the low-speed forward transmission gear 68. These gears 73, 74 are formed integrally with a boss portion 85 which is fitted onto the countershaft 64 through a one-way clutch 86 and friction cone-type torque limiters 87 provided axially on both sides of the one-way clutch 86. An intermediate output gear 75 is fixed to a left end portion of the countershaft 64.

The intermediate output gear 75 is in mesh with an output gear 80 fixed to a left end portion of the output shaft 63. A bevel gear 81 formed integrally with a right end portion of the output shaft 63 is in mesh with the bevel gear 82 fixed onto the drive shaft 17.

The reverse transmission gear 69 provided at a left end of the transmission input shaft 62 is in mesh with a first reverse idle gear 77, and the first reverse idle gear 77 and a second reverse idle gear 78 adjacent to the gear 77 are fixed onto the reverse idle shaft 65 of FIG. 6. The second reverse idle gear 78 is in mesh with an intermediate output gear 75 of the countershaft 64.

One-Way Clutch and Torque Limiter

Figure 8:
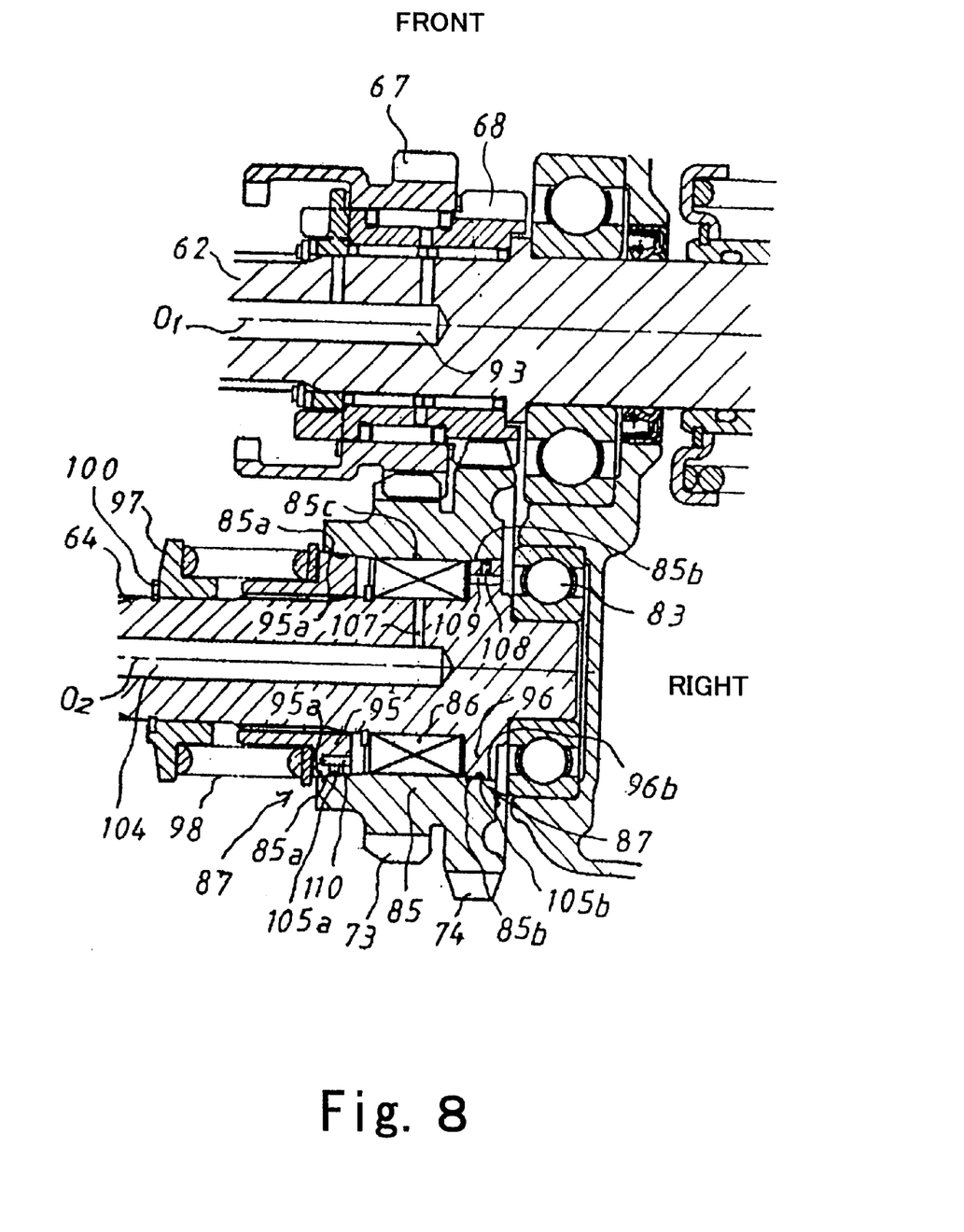
FIG. 8 is a partially enlarged cross-sectional view of a one-way clutch and a torque limiter of FIG. 7.

FIG. 8 is a partially enlarged view of the one-way clutch 86 and the torque limiter 87 of FIG. 7 placed between the countershaft 64 and the forward intermediate gears 73, 74. Here, the torque transmitted from the engine 3 toward the wheels 1, 2 during normal traveling, i.e., traveling by engine revolution (engine drive) is referred to as "drive torque", and the torque transmitted from the wheels 1, 2 toward the engine 3 during engine braking or deceleration is referred to as "wheel-side torque".

An inner peripheral face of the boss portion 85 integral with the forward intermediate gears 73, 74 has tapered faces 85a, 85b for the torque limiters axially at both side portions. The tapered faces 85a, 85b are inclined toward a center of the boss portion 85 such that their diameters become smaller as they are closer to the center of the boss portion 85 in the axial direction. An intermediate inner peripheral face 85c between the tapered faces 85a, 85b is cylindrical. The one-way clutch 86 is placed between the intermediate inner peripheral face 85c and the outer peripheral face of the countershaft 64. The one-way clutch 86 employs a sprag type generally employed for free wheels. The one-way clutch 86 transmits the drive torque of the engine 3 from the boss portion 85 to the countershaft 64 during forward drive rotation. Conversely, the one-way clutch 86 releases the wheel-side torque generated during deceleration or traveling on descending slope in order not to transmit the torque from the countershaft 64 to the boss portion 85.

A movable cone 95 having an outer peripheral tapered face 95a is spline-fitted onto the countershaft 64 so as to be axially movable and the outer peripheral tapered face 95a is taper-fitted to the left-side tapered face 85a, thereby forming left-side taper fitting portions (85a, 95a). An outer peripheral tapered face 96b of an integral cone 96 formed integrally with the countershaft 64 is taper-fitted to the right-side tapered face 85b, thereby forming right-side taper fitting portions (85b, 96b). A coil spring 98 for giving a friction force is compressively provided between the movable cone 95 and a spring receiver 97 placed on the countershaft 64 at the left side of the cone 95. The coil spring 98 serves to bias the movable cone 95 rightwardly to give a predetermined friction force to the left-side taper fitting portions 85a, 95a and the right-side taper fitting portions 85b, 96b. The spring receiver 97 is stopped by means of a stopper ring 100 to prevent leftward movement. The tapered faces 95a, 96b of the cones 95, 96 are respectively provided with annular grooves 105a, 105b for lubricating oil.

The tapered faces 85a, 85b, 95a, 96b are surface-hardened. Specifically, the tapered faces 85a, 85b of the boss portion 85 are hardened by gas nitrocarburizing and the tapered faces 95a, 96b of the cones 95, 96 are hardened by carburizing and the subsequent polishing.

Lubricating Path of One-Way Clutch and Torque Limiter

Referring to FIG. 7 again, a lubricating oil path 104 is formed in the countershaft 64 so as to extend along the center axis thereof. A left end portion of the lubricating oil path 104 communicates with a forced lubrication oil pump (not shown) via a lubricating oil intake portion 106 provided to the transmission case 11. A lubricating oil path 93 is formed in the transmission input shaft 62 for forced lubrication to bearing portions of the transmission gears 67, 68, 69.

Referring to FIG. 8 again, a right-end portion of the lubricating oil path 104 of the countershaft 64 communicates with a radially outwardly extending lubricating oil path 107 and a radially outer end of the lubricating oil path 107 communicates with an inner peripheral face of the one-way clutch 86.

The integral cone 96 is provided with a lubricating oil hole 109 axially penetrating therethrough. The lubricating oil hole 109 allows a right-side space of the one-way clutch 86 and a right-side space of the integral cone 96 (space in the gear-type transmission) to communicate with each other, and further, a lubricating oil hole 108 is formed in the lubricating oil hole 109 so as to extend radially outwardly and be opened in an annular groove 105b of the tapered face 96a.

A L-shaped lubricating oil hole 110 is formed in the movable cone 95 to allow a left-side space of the one-way clutch 86 and the annular groove 105a of the tapered face 95a to communicate with each other.

Referring to FIG. 3 again, the drive torque from the engine 3 is transmitted to the gear-type transmission 13 through the V-belt continuously variable transmission 15. The drive torque is further transmitted from the drive shaft 17 to the propeller shafts 18, 19 for the front and rear wheels 1, 2, and then to the front wheels 1 and the rear wheels 2 through differential gears in front and rear reduction gear cases 21, 22.

Referring to FIG. 7 again, the transmission input shaft 62 normally rotates in the forward direction regardless of forward drive or reverse drive. In the forward drive, the transmission output shaft 63 rotates in the normal direction (forward rotational direction) via only the countershaft 64, whereas in the reverse drive, it rotates in the reversed direction (reverse rotational direction) via the reverse idle shaft 65 (FIG. 6) and the countershaft 64.

Forward Drive

Referring to FIG. 7 again, during the high-speed forward drive, the forward dog claw 70a of the shift sleeve 70 is in mesh with the dog claw 67a of the high-speed forward transmission gear 67. Therefore, the drive torque transmitted from the driven shaft 27 to the transmission input shaft 62 is transmitted from the high-speed forward transmission gear 67 to the boss portion 85 through the high-speed forward intermediate gear 73, and all torque is transmitted to the countershaft 64 through the one-way clutch 86. During the low-speed forward drive, the forward dog claw 70a of the shift sleeve 70 is in mesh with the dog claw 68a of the low-speed forward transmission gear 68. Therefore, the drive torque transmitted from the driven shaft 27 to the transmission input shaft 62 of the gear-type transmission 13 is transmitted from the low-speed forward transmission gear 68 to the boss portion 85 through the low-speed forward intermediate gear 74 and all torque is transmitted to the countershaft 64 through the one-way clutch 86.

The torque is transmitted from the countershaft 64 to the drive shaft 17 through the intermediate output gear 75, the output gear 80, the transmission output shaft 63, and the bevel gears 81, 82.

In deceleration or traveling on the descending slope, the one-way clutch 86 is placed in a released state while the wheel-side torque is applied (while the engine brake is actuated). In this state, when the wheel-side torque is equal to or less than a predetermined value of the torque limiter 87, the base position 85 and the countershaft 64 are maintained in a connected state by the friction force of the taper fitting portions 85a, 85b, 95a, 96b, in which state, the engine braking effect is produced.

When the wheel-side torque is increased and becomes the predetermined value or more of the torque limiter 87 as in the case of rapid deceleration, the taper fitting portions 85a, 85b, 95a, 96b of the torque limiter 87 start to slide, thereby preventing the excessive engine braking effect from being produced.

Reverse Drive

Referring to FIG. 7 again, when the reverse dog claw 70b of the shift sleeve 70 is in mesh with the dog claw 69a of the reverse transmission gear 69, the drive torque transmitted from the driven shaft 27 to the transmission input shaft 62 is transmitted to the output gear 80 through the reverse transmission gear 69, the reverse idle gears 77, 78, and the intermediate output gear 75, thereby causing the output shaft 63 to rotate in the reversed direction.

Embodiment 2

Figure 9:
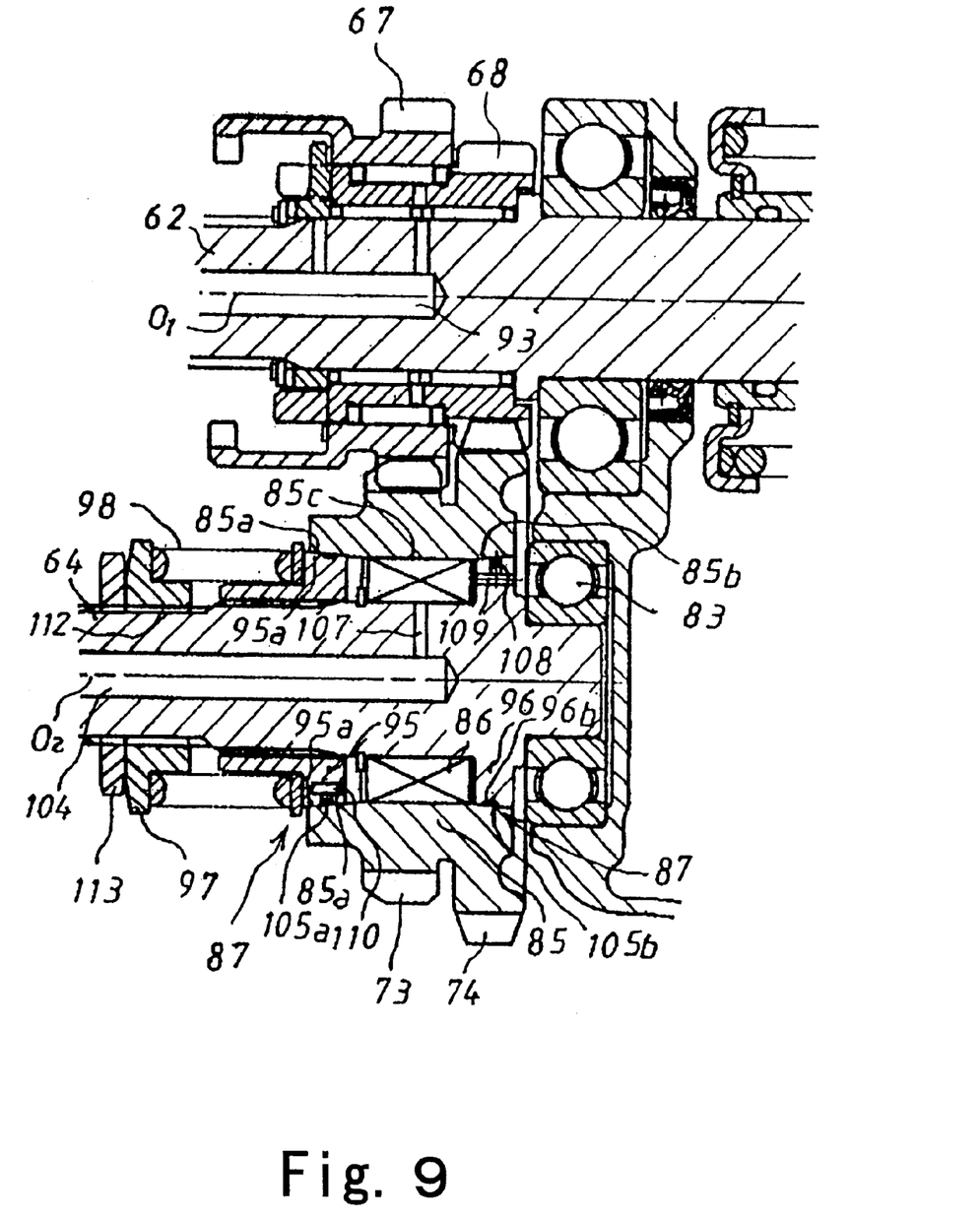
FIG. 9 is a partially enlarged cross-sectional view of a one-way clutch and a torque limiter according to another embodiment (corresponding to the cross-sectional view of FIG. 8)

Referring to FIG. 9, there is shown a structure of a power transmission device comprising a cone type torque limiter similarly to that shown in FIG. 8, in which the spring receiver 97 of the coil spring 98 for giving friction force is screwed onto a male screw portion 112 formed at the outer peripheral face of the countershaft 64 and locked by means of a lock nut 113, thereby allowing the spring receiver 97 to be axially adjustably fixed. The other components are similar to those of FIG. 8 and identified by common reference numerals.

In accordance with the constitution of FIG. 9, the spring receiver 97 and the lock nut 113 are rotated to cause their axial positions to be changed to thereby allow a set load of the coil spring 98 to be changed, thereby easily adjusting the set value of the torque limiter 87.

Embodiment 3

Figure 10:
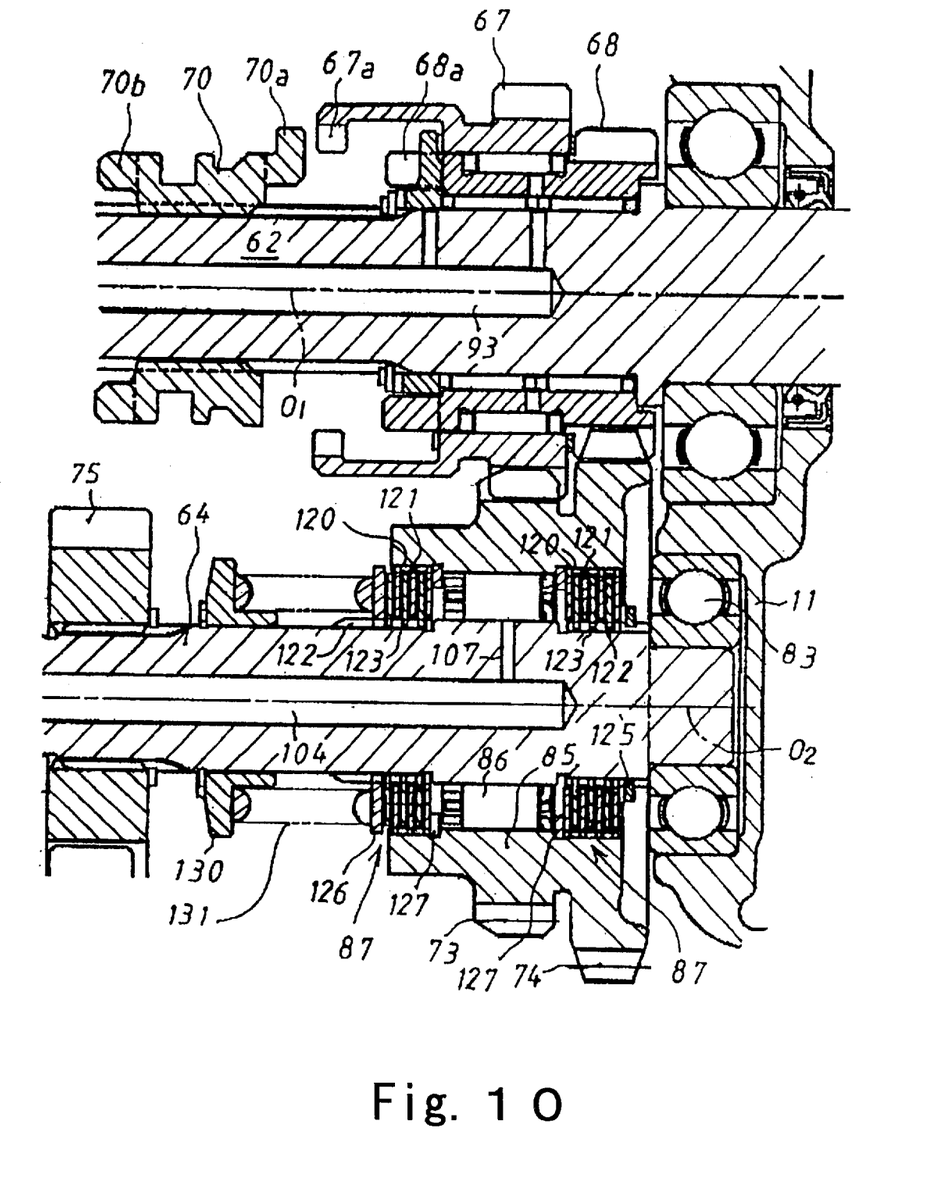
FIG. 10 is a partially enlarged cross-sectional view of a one-way clutch and a torque limiter according to a further embodiment (corresponding to the cross-sectional view of FIG. 8).

FIG. 10 shows the torque limiter 87 of a multi-plate friction type. Inner peripheral splines 120 are formed axially at both sides of the inner peripheral face of the boss portion 85 having the forward intermediate gears 73, 74. A plurality of gear-side friction plates 121 are spline-fitted into the inner peripheral splines 120 so as to be axially movable. Outer peripheral splines 122 are formed at an outer peripheral face of the countershaft 64 as opposed to the inner peripheral splines 120 from radially inside. A plurality of shaft-side friction plates 123 are spline-fitted to the outer peripheral splines 122 so as to be axially movable. The gear-side friction plate 121 and the shaft-side friction plate 123 are alternately arranged along the center axis of the countershaft 64.

The gear-side friction plates 121 placed closest to the right and left ends of the one-way clutch 86 are stopped by stopper rings 127 fitted to the inner peripheral face of the boss portion 85. A pressing plate 126 is in contact with the shaft-side friction plate 123 placed axially on the leftmost side and the shaft-side friction plate 123 placed axially on the rightmost side is stopped by a stopper ring 125 fitted to the countershaft 64.

There is provided a coil spring 131 for giving friction force between the pressing plate 126 and a spring receiver ring 130 placed on the countershaft 64 at the left side of the pressing plate 126. The coil spring 131 serves to bias the pressing plate 126 rightwardly to thereby cause the gear-side and shaft-side friction plates 121, 123 by a given pressure.

The other components are similar to those of FIGS. 7, 8 and identified by common reference numerals. Also, their functions are basically similar to those of FIGS. 7, 8. Specifically, during the normal forward drive, the drive torque transmitted to the transmission input shaft 62 is transmitted to the boss portion 85 through the high-speed forward transmission gear 67 and the high-speed forward intermediate gear 73, or through the low-speed forward transmission gear 68 and the low-speed forward intermediate gear 74, and all torque is transmitted to the countershaft 64 through the one-way clutch 86.

In deceleration or traveling on the descending slope, the one-way clutch 86 is placed in the released state while the wheel-side torque is applied (while the engine brake is applied).In this state, when the wheel-side torque is equal to or less than the predetermined value of the torque limiter 87, the base portion 85 and the countershaft 64 are maintained in a connected state by the friction force generated between the friction plates 121, 123, in which state, the engine braking effect is produced.

When the wheel-side torque is increased and becomes the predetermined value or more of the torque limiter 87 as in the case of rapid deceleration, the friction plates 121, 123 start to slide, thereby preventing the excessive engine braking effect from being produced.

Embodiment 4

The one-way clutch and the torque limiter may be placed between the transmission input shaft 62 and the forward transmission gear 67 of FIG. 7. In this case, the provision of the shift sleeve 70 and the dog claw mechanism for transmission to the countershaft 64 is helpful in ensuring a space for the one-way clutch 62 on the transmission input shaft 62.

The provision of the one-way clutch and the torque limiter on the transmission input shaft 62 can further reduce the capacity of the transmitted torque, and consequently, a more compact constitution can be achieved.

Embodiment 5

The one-way clutch and the torque limiter may be provided between the countershaft 64 and the intermediate output gear 75 placed at the left end portion of the countershaft 64 of FIG. 7. Moreover, the torque limiter using the friction cone of FIG. 7 may employ the structure in which the cone is provided only on one side of the one-way clutch in the axial direction.

Figure 11:
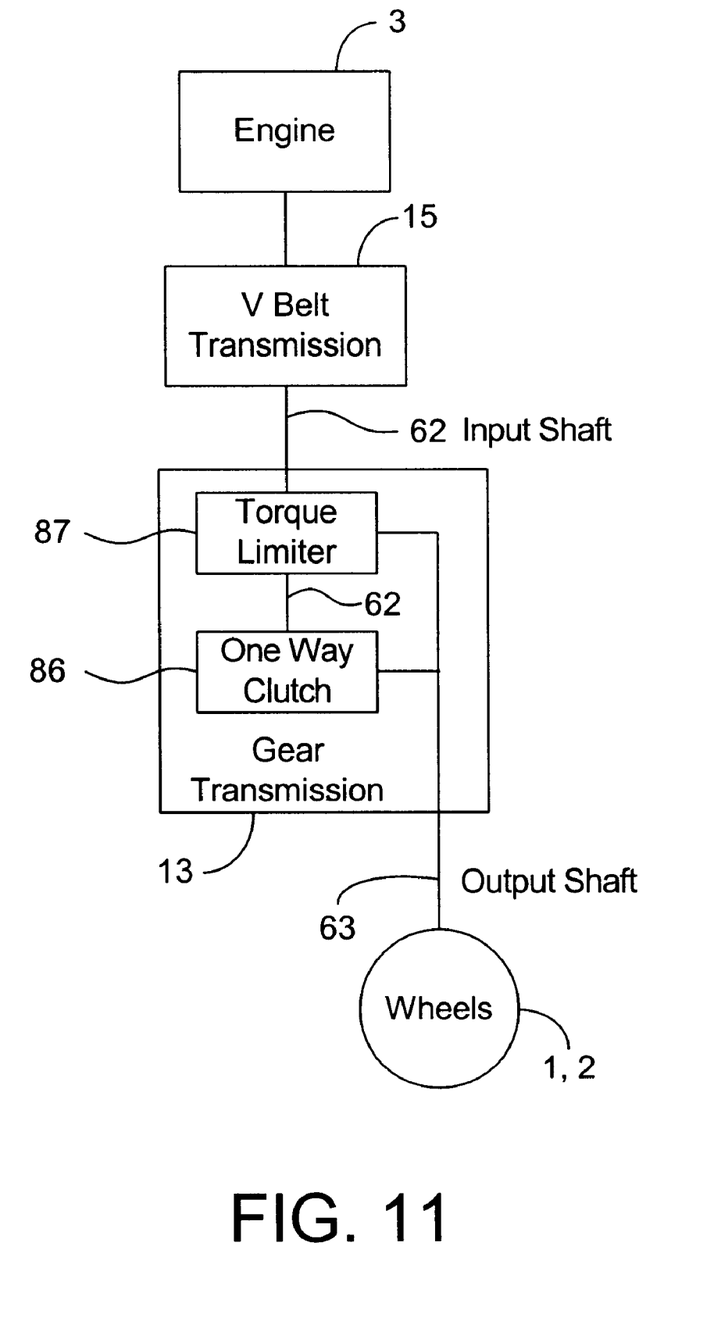
FIG. 11 shows a block diagram of a power transmission device according to another embodiment of the present invention.

As shown in FIG. 11, the transmission shaft of the power transmission device may include a transmission input shaft, a transmission output shaft, and a transmission intermediate shaft provided between the transmission input shaft and the transmission output shaft, wherein the one-way clutch and the torque limiter are provided to the transmission input shaft.

As this embodiment may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A power transmission device of an all terrain vehicle comprising:
    a V-belt continuously variable transmission;
    a gear-type transmission including a transmission shaft and a transmission gear fitted to the transmission shaft, the V-belt continuously variable transmission and the gear-type transmission being arranged in this order from upstream in a power transmission path from an engine to wheels;
    a one-way clutch provided between the transmission shaft and the transmission gear, for transmitting only a drive torque from the engine, the drive torque being transmitted through the V-belt continuously variable transmission, through the one-way clutch in the gear-type transmission, to the wheels; and
    a torque limiter provided between the transmission shaft and the transmission gear, such that the torque limiter and the one-way clutch establish two parallel power transmission paths between the transmission shaft and the transmission gear, the torque limiter being configured to transmit from the wheels to the engine a wheel-side torque of a predetermined value or less.

2. The power transmission device of an all terrain vehicle according to claim 1, wherein the torque limiter is of a multi-plate friction type that includes a plurality of friction plates sandwiched with each other, and that rotatably connects the transmission shaft with the transmission gear through the friction plates, wherein the wheel-side torque is limited by friction between the friction plates.

3. The power transmission device of an all terrain vehicle according to claim 1, wherein the one-way clutch is of a sprag-type.

4. The power transmission device of an all terrain vehicle according to claim 1, wherein the transmission shaft, the transmission gear, the one-way clutch, and the torque limiter are placed in a case covering the gear-type transmission.

5. The power transmission device of an all terrain vehicle according to claim 1, wherein the transmission shaft is one of a plurality of transmission shafts of the gear-type transmission, the plurality of shafts including:
    a transmission input shaft;
    a transmission output shaft; and
    a transmission intermediate shaft provided between the transmission input shaft and the transmission output shaft, wherein
        the one-way clutch and the torque limiter are provided to the transmission input shaft.

6. The power transmission device of an all terrain vehicle according to claim 1, wherein the transmission shaft is one of a plurality of transmission shafts of the gear type transmission, each of the transmissions shafts including an associated transmission gear, the plurality of transmission shafts including:
    a transmission input shaft coaxially coupled with a driven shaft of the V-belt continuously variable transmission;
    a transmission output shaft coupled rotatably with a drive shaft of the wheels; and
    a transmission intermediate shaft provided between the transmission input shaft and the transmission output shaft, wherein the transmission gear on the transmission intermediate shaft are to be meshed with the transmission gear on the transmission input shaft and the transmission output shaft such that the transmission intermediate shaft transmits a rotation between the transmission input shaft and the transmission output shaft through the transmission gears, and wherein
    the one-way clutch and the torque limiter are both provided between the transmission intermediate shaft and the transmission gear thereon.

7. The power transmission device of an all terrain vehicle according to claim 1, wherein the torque limiter includes:
    an inner peripheral tapered face formed on a side-end portion of the transmission gear;
    a cone member positioned on the transmission shaft and configured to rotate therewith, having an outer peripheral tapered face being pressed against the inner peripheral tapered face; and
    a biasing means for causing the inner peripheral tapered face and the outer peripheral tapered face to be pressed against each other by a given force.

8. The power transmission device of an all terrain vehicle according to claim 7, wherein the inner peripheral tapered face and the outer peripheral tapered face are surface-treated.

9. The power transmission device of an all terrain vehicle according to claim 7, wherein the inner peripheral tapered face is formed in an inner face of the transmission gear which includes a first gear portion and a second gear portion with different transmission gear ratios which are integrally formed together on an outer face of the transmission gear.

10. The power transmission device of an all terrain vehicle according to claim 7, wherein the inner peripheral tapered face includes a first inner peripheral tapered face formed on one side-end portion of the transmission gear and a second inner peripheral tapered face formed on the other side-end portion of the transmission gear, and the cone member of the torque limiter includes a first cone member and a second cone member each having outer peripheral tapered faces corresponding to the first and second inner peripheral tapered faces, respectively; and
    wherein the first and second cone members are provided axially at both sides of the one-way clutch.

11. The power transmission device of an all terrain vehicle according to claim 10, wherein at least one of the first and second cone members is axially slidably fitted to the transmission shaft.

12. The power transmission device of an all terrain vehicle according to claim 11, wherein the biasing means is a spring, the power transmission device further comprising:
    a stopper means for stopping the spring in a compressive state between the at least one of the first and second cone members and the stopper means.

13. The power transmission device of an all terrain vehicle according to claim 12, wherein the stopper means is screwed onto a screw portion threaded on an outer peripheral face of the transmission shaft.

14. The power transmission device of an all terrain vehicle according to claim 1, further comprising:
- a first lubricating oil path axially formed in the transmission shaft and connected to an external lubricating oil supply source; and
- a second lubricating oil path radially formed in the transmission shaft and allowing the first lubricating oil path and an inner peripheral of the one-way clutch fitted to the transmission shaft to communicate with each other;
- wherein the lubricating oil paths are for supplying a lubricating oil.

15. The power transmission device of an all terrain vehicle according to claim 14, further comprising:
- a third lubricating oil path allowing the second lubricating oil path and a space in the gear-type transmission to communicate with each other through the one-way clutch.

16. The power transmission device of an all terrain vehicle according to claim 14, further comprising:
- a fourth lubricating oil path allowing the second lubricating oil path and the torque limiter to communicate with each other through the one-way clutch.

17. An all terrain vehicle comprising:
- an engine;
- a power transmission path from the engine to wheels; and
- a power transmission device including:
  - a V-belt continuously variable transmission;
  - a gear-type transmission including a plurality of transmission shafts and a transmission gear fitted to each of the transmission shafts, wherein the V-belt continuously variable transmission and the gear-type transmission being arranged in this order from upstream in the power transmission path;
  - a one-way clutch provided between one of the transmission shafts and the transmission gear thereon, for transmitting only a drive torque from the engine toward the wheels; and
- a torque limiter provided between the one of the transmission shafts and the transmission gear thereon so as to establish two parallel power transmission paths with the one-way clutch, for transmitting a wheel-side torque from the wheels toward the engine of a predetermined value or less.

18. A power transmission device of an all terrain vehicle, comprising:
- a V-belt continuously variable transmission;
- a gear-type transmission including:
  - a transmission input shaft;
  - a transmission output shaft;
  - a transmission intermediate shaft provided between the transmission input shaft and the transmission output shaft; and
  - transmission gears fitted to each of the transmission input shaft, the transmission output shaft, and the transmission intermediate shaft, wherein the V-belt continuously variable transmission and the gear-type transmission are arranged in this order from upstream in a power transmission path from an engine to wheels;
- a one-way clutch provided for transmitting only a drive torque from the engine toward the wheels; and
- a torque limiter for transmitting the drive torque of a predetermined value or less;
- wherein the one-way clutch and the torque limiter are provided between the transmission intermediate shaft and a transmission gear fitted to the transmission intermediate shaft.

19. A power transmission device of an all terrain vehicle comprising:
- a V-belt continuously variable transmission and a gear-type transmission including a transmission shaft and a transmission gear fitted to the transmission shaft, the V-belt continuously variable transmission and the gear-type transmission being arranged in this order from upstream in a power transmission path from an engine to wheels;
- a one-way clutch provided between the transmission shaft and the transmission gear, for transmitting only a drive torque from the side of the engine toward the side of the wheels; and
- a torque limiter for transmitting the drive torque of a predetermined value or less, wherein the torque limiter includes:
  - an inner peripheral tapered face formed at the transmission gear;
  - a cone member having an outer peripheral tapered face being pressed against the inner peripheral tapered face; and
  - a biasing means for causing the inner peripheral tapered face and the outer peripheral tapered face to be pressed against each other by a given force;
- wherein one or a plurality of cone members is provided and at least one of the cone members is axially slidably fitted to the transmission shaft; and
- wherein the biasing means is a spring, and the power transmission device further comprises a stopper means for stopping the spring in a compressive state between the cone member and the stopper means.

20. The power transmission device of an all terrain vehicle according to claim 19, wherein the stopper means is screwed onto a screw portion threaded on an outer peripheral face of the transmission shaft.

* * * * *